United States Patent
Miller et al.

(10) Patent No.: US 11,002,380 B2
(45) Date of Patent: May 11, 2021

(54) METHODS AND APPARATUS TO VALIDATE VALVE POSITION PARAMETERS

(71) Applicant: Fisher Controls International LLC, Marshalltown, IA (US)

(72) Inventors: Lorin Dion Miller, Colo, IA (US); Eric William Strong, Marshalltown, IA (US); Gregory Wade Jacobs, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 470 days.

(21) Appl. No.: 15/889,885

(22) Filed: Feb. 6, 2018

(65) Prior Publication Data
US 2019/0242496 A1 Aug. 8, 2019

(51) Int. Cl.
*F16K 37/00* (2006.01)
*G05B 19/05* (2006.01)
*G05B 19/042* (2006.01)

(52) U.S. Cl.
CPC ...... *F16K 37/0083* (2013.01); *G05B 19/0428* (2013.01); *G05B 19/058* (2013.01); *G05B 2219/14006* (2013.01); *G05B 2219/15023* (2013.01); *G05B 2219/24188* (2013.01); *G05B 2219/25428* (2013.01)

(58) Field of Classification Search
CPC ............... F16K 37/0083; F16K 31/408; G05B 19/0428; G05B 19/058; G05B 2219/24188; G05B 2219/25428; G05B 2219/15023; G05B 2219/14006; G05B 2219/31282; G05B 19/4183
See application file for complete search history.

(56) References Cited

U.S. PATENT DOCUMENTS

| | | | |
|---|---|---|---|
| 6,267,349 B1 * | 7/2001 | Gomes | F16K 31/408 251/30.04 |
| 2012/0239315 A1 * | 9/2012 | Baker | G01M 3/025 702/51 |

(Continued)

OTHER PUBLICATIONS

International Searching Authority, "International Search Report," dated Apr. 18, 2019, in connection with International Patent Application No. PCT/US2019/014648, 6 pages.

(Continued)

*Primary Examiner* — Mohamed Charioui
(74) *Attorney, Agent, or Firm* — Hanley, Flight & Zimmerman, LLC (57) ABSTRACT

Methods, apparatus, and articles of manufacture to validate position parameters of a valve are disclosed. An example apparatus includes a field device, the field device further including a sensor interface to receive an unprocessed valve position parameter from a sensor and a position comparator to determine a deviation between the unprocessed valve position parameter and an interpreted valve position parameter and a valve position validator apparatus, the valve position validator apparatus further including a parameter comparator to determine if the deviation exceeds a threshold and an alert generator to generate an alert when the parameter comparator determines the deviation exceeds the threshold.

14 Claims, 7 Drawing Sheets

(56) References Cited

U.S. PATENT DOCUMENTS

| | | | |
|---|---|---|---|
| 2012/0248356 A1* | 10/2012 | Okuda | F16K 31/12 |
| | | | 251/129.15 |
| 2013/0103989 A1 | 4/2013 | Jensen | |
| 2014/0209179 A1* | 7/2014 | Maier | G01F 1/363 |
| | | | 137/12 |
| 2014/0261791 A1 | 9/2014 | Grabau et al. | |
| 2014/0325255 A1 | 10/2014 | Jensen | |
| 2015/0142340 A1* | 5/2015 | Radomsky | F16K 31/1635 |
| | | | 702/35 |
| 2017/0102717 A1 | 4/2017 | Seberger et al. | |
| 2017/0356283 A1* | 12/2017 | Al-Gouhi | E21B 47/00 |

OTHER PUBLICATIONS

International Searching Authority, "Written Opinion," dated Apr. 18, 2019, in connection with International Patent Application No. PCT/US2019/014648, 6 pages.

* cited by examiner

METHODS AND APPARATUS TO VALIDATE VALVE POSITION PARAMETERS

FIELD OF THE DISCLOSURE

This disclosure relates generally to valve control systems and, more particularly, to methods and apparatus to validate position parameters of a valve.

BACKGROUND

In recent years, process control systems, like those used in chemical, petroleum, and/or other processes, have grown progressively more complex with the proliferation of field devices that include increased processing power. Current generation process control systems include a greater number and variety of field devices or instruments for measuring and/or controlling different aspects of a process control environment. In addition to utilizing field devices to monitor and/or control core processes, field devices have been increasingly used for peripheral tasks such as self-diagnostic testing.

Process control systems in which field devices fail or degrade (e.g., a component of the field devices fails or degrades) during operation can experience increased periods of downtime. Field device failure/degradation during operation can also create undesirable operating conditions if the failed field devices provide erroneous or inaccurate data to the process control system. The possibility of failed field devices creating undesirable operating conditions can be mitigated by implementing a redundant feedback circuit in the field device.

Field devices within the process control system may be located in difficult environments such as areas with extreme vibration, high pressure, and/or wide temperature ranges that may cause accelerated failure. With the implementation of increasingly powerful field devices at decreasing cost, process control systems can implement field devices capable of performing self-diagnostics. Monitoring field devices using self-diagnostics in a redundant manner can mitigate the effects of a potentially faulty field device and enable technicians to replace the potentially faulty field devices during periodic maintenance as opposed to halting operation of the system to replace field devices.

SUMMARY

An example apparatus to validate position parameters of a valve includes a field device, the field device further including a sensor interface to receive an unprocessed valve position parameter from a sensor and a position comparator to determine a deviation between the unprocessed valve position parameter and an interpreted valve position parameter and a valve position validator apparatus, the valve position validator apparatus further including a parameter comparator to determine if the deviation exceeds a threshold and an alert generator to generate an alert when the parameter comparator determines the deviation exceeds the threshold.

An example method to validate position parameters of a valve includes receiving an unprocessed valve position parameter from a sensor, determining a deviation between the unprocessed valve position parameter and an interpreted valve position parameter, determining if the deviation exceeds a threshold, and generating an alert in response to determining the deviation exceeds the threshold.

An example non-transitory computer readable storage medium to validate position parameters of a valve includes instruction which, when executed, cause a machine to at least receive an unprocessed valve position parameter from a sensor, determine a deviation between the unprocessed valve position parameter and an interpreted valve position parameter, determine if the deviation exceeds the threshold, and generate an alert when it is determined the deviation exceeds the threshold.

BRIEF DESCRIPTION OF THE DRAWINGS

Wherever possible, the same reference numbers will be used throughout the drawing(s) and accompanying written description to refer to the same or like parts.

DETAILED DESCRIPTION

Process control systems are growing increasingly complex as individual components with increased data acquisition resolution, processing power and signal conditioning are developed. Process control systems are used to monitor and/or to control different aspects of an operation to be conducted in a process control environment such as, for example, manufacturing components, processing raw chemical materials, etc. Process control systems typically contain at least one controller with accompanying inputs and outputs, which allow the controller(s) to acquire signals from various input field devices and/or instruments and control various output field devices and/or instruments.

As used herein, the terms "field device" and "instrument" refer to control devices such as, for example, actuators, actuator assemblies, actuator controllers, actuator positioners, sensors, transmitters, valve assemblies, etc. that may be used throughout a process control system to measure and/or control different aspects (e.g., other process control devices) of the process control system. A field device such as a valve (e.g., a valve assembly) may include both electrical and mechanical components. For example, the valve may include electrical components such as a digital valve positioner, a flow rate sensor, a pressure sensor, a travel sensor, a valve controller, etc. In another example, the valve may include mechanical components such as an actuator (e.g., a hydraulic actuator, a pneumatic actuator, etc.), a mechanical housing, a process connection, etc.

Field device failures can result from a multitude of causes such as, for example, continuous operation, environmental factors, manufacturing defects, etc. In some examples, field devices may operate in hi-cycle applications. For example, a valve may continuously conduct a full-stroke operation that includes the valve stroking from fully open to fully closed and from fully closed to fully open. Such full-stroke valves may be designed for extended operating lifecycles. However, the timing of an inevitable failure may not be predictable and may occur during operation. Not knowing when a field device is expected to fail or about to reach a condition of impending failure poses a significant problem to the continuous operation of existing process control systems. A sudden field device failure during operation may result in the loss of the field device and equipment that the field device was monitoring and/or controlling.

Examples disclosed herein relate to process control systems and, more specifically, to validating position parameters of a valve. In general, the examples determine valve position parameters and deviations between the values of the valve position parameters. In response to a calculated deviation exceeding a determined threshold, the examples disclosed herein are further to generate an alarm condition. While the examples described below are described as being applied to process control systems including a valve, the teachings of this disclosure may be more generally applied to parameters associated with other devices in a process control system such as actuators, solenoids, data acquisition modules, pumps, thermal management systems, etc.

As will be set forth in greater detail below, the examples disclosed herein provide a valve position validator (VPV) apparatus to validate one or more position measurements of a valve. More specifically, the VPV apparatus disclosed herein obtains valve information from sensing/field devices such as, for example, actuator controllers (e.g., valve controllers), position sensors (e.g., digital valve positions, position transmitters, proximity sensors, etc.), process sensors (e.g., flow rate sensors, pressure sensors, etc.), etc. In some examples, the valve information may include parameters related to the operation of the valve (e.g., valve parameters). Further, the valve parameters may include parameters directly related to the position of the valve such as a commanded or input signal (e.g., a travel set point, a commanded position of the valve, a command signal for an actuator, etc.), a valve position or valve travel (e.g., a position of a valve, a measured position of a valve, etc.), a valve position interpreted value (e.g., an interpretation of a valve position signal received from a sensor), a drive signal, etc.

In some examples, the VPV apparatus determines which valve position parameters are available based on the power status of sensing devices included in the field device that distribute valve position parameters to the VPV apparatus. In some examples, the VPV apparatus may determine a valve controller is powered on. In such examples, the VPV apparatus can calculate a deviation between a position of the valve as interpreted by the valve controller and an unprocessed valve position measurement as received by the field device. Additionally or alternatively, the VPV apparatus may determine a position transmitter is powered on. In such examples, the VPV apparatus can calculate a deviation between a position of the valve as interpreted by the position transmitter and the unprocessed valve position measurement as received by the field device.

Additionally or alternatively, the VPV apparatus may determine a valve controller and position sensor are powered on. In such examples, the VPV apparatus can calculate a deviation between at least one of the valve controller valve position interpretation, the position transmitter valve position interpretation, and the valve position measurement as received by the field device. In some examples, the VPV apparatus can further utilize a voting scheme (e.g., determine a valve position in common for a majority of the measurements) to determine the current position of the valve.

In some examples, the VPV apparatus calculates a threshold deviation for at least one pair of valve parameters. For example, the VPV apparatus can calculate a threshold deviation between the valve controller interpreted position of the valve and the position of the valve received by the field device. Additionally or alternatively, the VPV apparatus can calculate a threshold deviation between the position transmitter interpreted position of the valve and the position of the valve received by the field device. Additionally or alternatively, the VPV apparatus can calculate a threshold deviation between the position transmitter position of the valve and the valve controller interpreted position of the valve.

In some examples, the threshold deviation can be a pre-defined value, set by at least one of a computer algorithm and/or a user/manager of the process control environment. Additionally or alternatively, the threshold deviation can be a dynamic value set by a computer algorithm, the dynamic value varying based on the instantaneous or historical operation of the process control system. Additionally or alternatively, the threshold deviation can be a value utilized to confirm the field device meets the accuracy safety function requirements as specified in device certification for the device.

In some examples, the VPV apparatus compares the threshold deviation for a pair of valve parameters with the difference received from the field device. In such examples, the VPV apparatus can generate an alert in response to the received difference for the pair of valve parameters exceeding the threshold deviation for the pair of valve parameters. In some such examples, the generated alert can be an auditory or visual alert such as a stack light, a buzzer, a siren, and/or any other form of audio/visual cue, etc.

Additionally or alternatively, the generated alert can be a notification sent to a user/manager of the process control system. For example, the generated alert can be a short message service (SMS) text message sent to a telephone number associated with the user/manager of the process control system. In another such example, the generated alert can be an electronic mail (e-mail) message sent to an e-mail address associated with the user/manager of the process control system.

Additionally or alternatively, the generated alert can be a notification sent to a higher-level controller (e.g., a programmable logic controller (PLC), a plant level controller, a cloud computing device, etc.) in the process control system. For example, the notification can be a digital data packet signifying the alert condition, the digital data packet sent to the higher-level controller. Additionally or alternatively, the notification can be a digital output signal (e.g., a HIGH signal output, a 5 Volt output signal, a 12 Volt output signal, a 20 milliamp output signal, etc.) sent from a digital output of the VPV apparatus to the higher-level controller.

As will be discussed in greater detail below in accordance with the teachings of this disclosure, the VPV apparatus can have various configurations that may depend on a type of valve and/or characteristics associated with the process control environment in which the valve is disposed. In examples disclosed herein, these configurations can be changed or altered to optimize the ability of the VPV apparatus to detect a faulty field device before failure of the field device impairs the continuous operation of a process control system.

Figure 1:
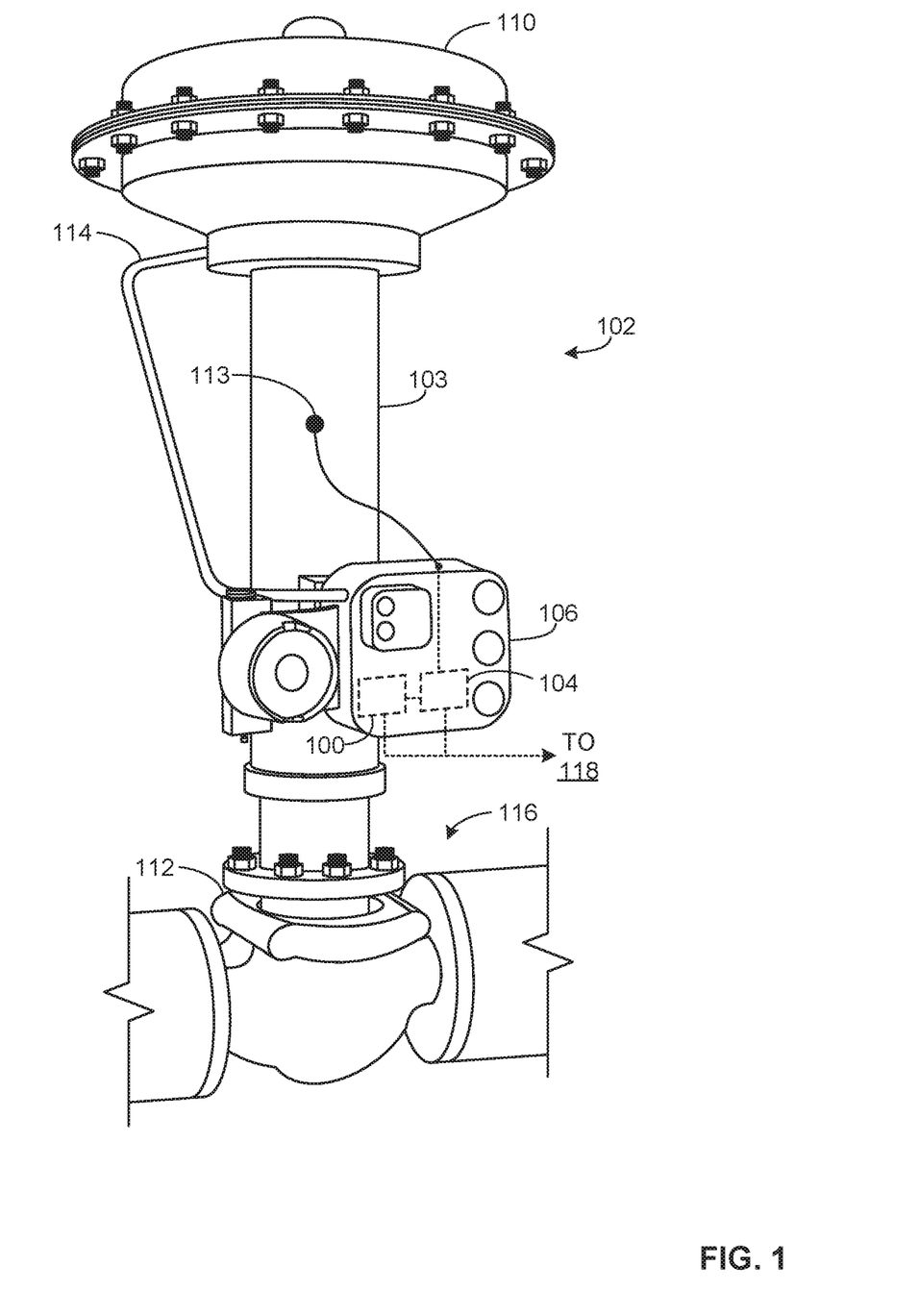
FIG. 1 is a schematic illustration of an example valve position validator apparatus and field device in accordance with the teachings of this disclosure.

Turning to FIG. 1, an example valve position validator (VPV) apparatus 100 disclosed herein operates in a process control environment 102 by obtaining valve position information for a valve assembly 103 from a field device 104. A first example implementation of the field device 104 is further described in conjunction with FIG. 2 and a second example implementation is further described in conjunction with FIG. 3. In some examples, the field device 104 may further include an electronic valve controller, a wireless valve position transmitter, a wired valve position transmitter, etc. In the illustrated example, the VPV apparatus 100 and the field device 104 are housed in an enclosure 106 and coupled to the example pneumatically actuated valve assembly 103 that includes at least an actuator 110, a valve 112 (e.g., a butterfly valve, a gate valve, etc.), and a sensor 113 (e.g., an encoder, a hall effect sensor, a pressure sensor, a temperature sensor, a travel sensor, etc.).

However, other valve assemblies may additionally or alternatively be utilized, such as an electrically actuated valve assembly, a hydraulically actuated valve assembly, etc. In the illustrated example, the field device 104 includes an electronic valve controller that measures one or more parameters of the actuator 110 and/or the valve 112 (e.g., the position of the valve 112) with the sensor 113 and/or controls the actuator 110 and/or the valve 112.

Additionally, the field device 104 may measure a parameter such as, for example, valve travel (e.g., a position of a valve), an actuator pressure, a drive signal, etc. with the sensor 113. The field device 104 may control the actuator 110 and/or the valve 112 via a parameter such as, for example, a command or an input signal (e.g., a travel set point). The enclosure 106 for the field device 104 includes a connection point for a pneumatic tube connection 114. The field device 104 may further enable pneumatic control of the actuator 110 via the pneumatic tube connection 114.

In the illustrated example, the valve assembly 103 is installed in a fluid process system 116 (e.g., a distribution piping system) of a plant environment or processing system. The fluid process system 116 may be located in an environment that may expose the field device 104 to one or more difficult operating conditions (e.g., extreme vibration, a wide temperature range, etc.) and cause premature failure of the field device 104. For example, the field device 104 may be installed downstream of a positive-displacement pump and subjected to extreme vibration. Different failure modes of the field device 104 may occur due to the extreme vibration causing damage and/or degradation of the electrical components of the field device 104.

In the illustrated example, the field device 104 is coupled to the example VPV apparatus 100. Although the field device 104 is depicted in FIG. 1 as coupled to the example VPV apparatus 100 via a physical connection, the field device 104 and the VPV apparatus 100 could instead be coupled via a network including, for example, one or more data buses, one or more Local Area Networks (LANs), one or more wireless LANs, one or more cellular networks, one or more private networks, one or more public networks, etc. The example VPV apparatus 100 obtains at least one of interpreted and/or measured valve position parameters in addition to deviations between these parameters from the field device 104 during operation (e.g., an operational process) to identify any deviations exceeding a calculated threshold. Additionally, at least one of the VPV apparatus 100 and the field device 104 may be communicatively coupled to a process control system 118 that includes a controller for data acquisition and/or processing.

Figure 2:
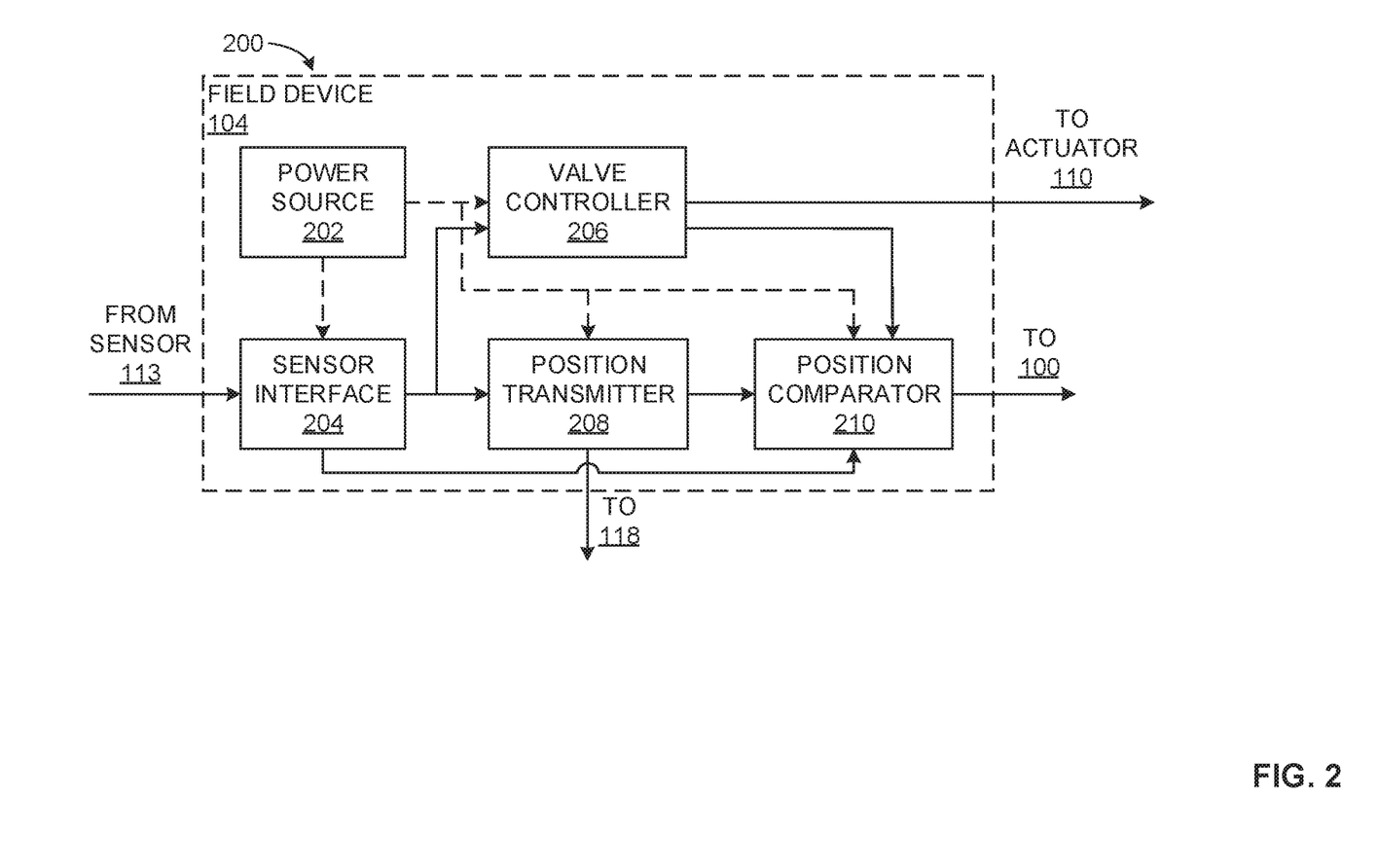
FIG. 2 is a block diagram of an example implementation of the field device of FIG. 1.

FIG. 2 is a block diagram of a first example implementation 200 of the field device 104. The example field device 104 can, in some examples, include an example power source 202, an example sensor interface 204, an example valve controller 206, an example position transmitter 208, and an example position comparator 210.

The example power source 202, included or otherwise implemented by the field device 104, is capable of powering one or more of the components of the field device 104 that can, in some examples, include the sensor interface 204, the valve controller 206, the position transmitter 208, and the position comparator 210. In some examples, the power source 202 can be controlled by an automated process and is turned on/off based upon at least one of a pre-determined schedule and/or a dynamic schedule based upon one or more parameters of the process control environment 102. Additionally or alternatively, the power source 202 can be manually controlled by a user/operator working in the process control environment 102. In some examples, the power source 202 can independently power each of the sensor interface 204, the valve controller 206, the position transmitter 208, and the position comparator 210 (e.g., one or more of the components can be turned on/off individually). In some examples, the power source 202 is further to transmit at least one of a power status of the field device 104 or a power status of components included in the field device 104 (e.g., the sensor interface 204, the valve controller 206, etc.).

The example sensor interface 204, included in or otherwise implemented by the field device 104, is capable of receiving a signal from the sensor 113 (e.g., an encoder, a hall effect sensor, a pressure sensor, a temperature sensor, a travel sensor, etc.). In some examples, the signal received is an analog voltage corresponding to a valve parameter output by the sensor 113. Additionally or alternatively, the signal received may be a data packet including a digital representation (e.g., a hex value based on a communication protocol data packet) of the valve parameter as output by the sensor 113. In some examples, the sensor interface is further to distribute the received signal to at least one of the valve controller 206 and the position transmitter 208.

The example valve controller 206 and the example position transmitter 208, each included in or otherwise implemented by the field device 104, are capable of receiving an unprocessed signal from the sensor interface 204 and independently interpreting (e.g., converting) it to a valve parameter (e.g., valve position, valve status, valve temperature, actuator current, etc.) in a desired format. In some examples, the valve controller 206 and/or the position transmitter 208 perform a calculation based upon the unprocessed signal received from the sensor interface 204, wherein the unprocessed signal may include an analog electrical signal (e.g., a voltage amplitude, a current measurement, etc.), a digital electrical signal (e.g., a hex value based on a communication protocol data packet), etc.

In some examples, the valve controller 206 and/or the position transmitter 208 may calculate a valve position parameter based on an unprocessed voltage value and a calibration curve that correlates the unprocessed analog voltage value to a valve position (e.g., the valve 112 is 100% closed, the valve 112 is 50% closed, the valve 112 is 25% open, etc.). Additionally or alternatively, the valve controller 206 and/or the position transmitter 208 may calculate a valve position parameter based on an unprocessed digital electrical signal (e.g., a hex value based on a communication protocol data packet) and a lookup table that correlates the unprocessed digital electrical signal to a valve position (e.g., the valve 112 is 100% closed, the valve 112 is 50% closed, the valve 112 is 25% open, etc.).

In response to determining one or more valve position parameters, the valve controller 206 and/or the position transmitter 208 can further distribute the valve position parameters, independently interpreted by at least one of the valve controller 206 and/or the position transmitter 208, to at least one of the process control system 118 and the position comparator 210. In some examples, the interpreted valve position parameter distributed to at least one of the process control system 118 and the position comparator 210 may be distributed as an analog current (e.g., a 4-20 milliamp current loop signal) corresponding to a valve parameter as output by the sensor 113.

Additionally, the example valve controller 206 is capable of controlling a position of the valve 112 through the actuator 110. In some examples, the valve controller 206 determines a position to which the valve 112 is to be commanded. In some examples, the position commanded to the valve 112 can be determined automatically by the process control system 118. In such examples, the computer can determine the position to which the valve 112 is to be commanded or moved based upon a desired flow parameter of the valve 112. Additionally or alternatively, the position to which the valve 112 is to be commanded can be determined by a user/operator.

Additionally or alternatively, the valve controller 206 determines a desired position of the valve 112 and utilizes the desired position of the valve 112 in addition to the interpreted valve position parameter, the interpreted valve position parameter interpreted from the signal received at the sensor interface 204 from the sensor 113, in a closed control loop. In such examples, the desired position of the valve 112 can be an input to the closed control loop and the valve position parameter received from the sensor interface 204 and interpreted by the valve controller 206 can be a feedback signal in the closed control loop. Further in such examples, the closed control loop may utilize a controller (e.g., PI controller, a PID controller, a model based controller, etc.) in conjunction with the input signal (e.g., the desired position of the valve) and the feedback signal (e.g., the valve position parameter) to determine a control signal. In some examples, the desired position of the valve 112 can be determined automatically by a computer. In such examples, the computer can determine the desired position of the valve 112 based upon a desired flow parameter of the valve 112. Additionally or alternatively, the desired position of the valve 112 can be determined by a user/operator.

In response to determining at least one of a command position, a control signal, and an interpreted valve position parameter for the actuator 110, the valve controller 206 can further distribute at least one of the commanded position, the control signal, and the interpreted valve position parameter to at least one of the actuator 110 and the position comparator 210.

The example position transmitter 208, in addition to independently interpreting a valve position parameter, is further capable of distributing the interpreted valve position parameter to at least one of the process control system 118 and the position comparator 210. In some examples, the interpreted valve position parameter is distributed as a 4-20 milliamp signal (e.g., a 4-20 milliamp analog signal, a 4-20 milliamp current loop, a sinking current, etc.). Additionally or alternatively, the interpreted valve parameter can be distributed wirelessly via a network such as any suitable wired and/or wireless network(s) including, for example, one or more data buses, one or more Local Area Networks (LANs), one or more wireless LANs, one or more cellular networks, one or more private networks, one or more public networks, etc. Additionally or alternatively, the interpreted valve position parameter can be distributed as any digital and/or analog signal.

The position comparator 210, included in or otherwise implemented by the field device 104, is capable of receiving one or more signals, the one or more signals including at least one of an unprocessed valve position parameter received from the sensor interface 204, an interpreted/processed valve position parameter from the valve controller 206, and an interpreted/processed valve position parameter from the position transmitter 208.

Additionally, the position comparator 210 can, in some examples, determine deviations between one or more pairs of received valve position parameters. For example, the position comparator 210 can determine the deviation between at least one of the valve controller 206 interpreted valve position parameter and the position transmitter 208 interpreted valve position parameter, the valve controller 206 interpreted valve position parameter and the unprocessed valve position parameter received by the sensor interface 204, and the position transmitter 208 interpreted valve position parameter and the unprocessed valve position parameter received by the sensor interface 204.

In some examples, the position comparator 210 may include an electrical circuit, wherein the electrical circuit is to sum and/or subtract received signals corresponding to valve position parameters to determine the deviation between the parameters. Additionally or alternatively, the position comparator 210 may include computer implemented hardware and/or software capable of determining deviations between received parameters. In response to calculating one or more deviations, the position comparator 210 is further to distribute at least one of the received valve position parameters and the calculated deviations to the valve position validator apparatus 100.

Figure 3:
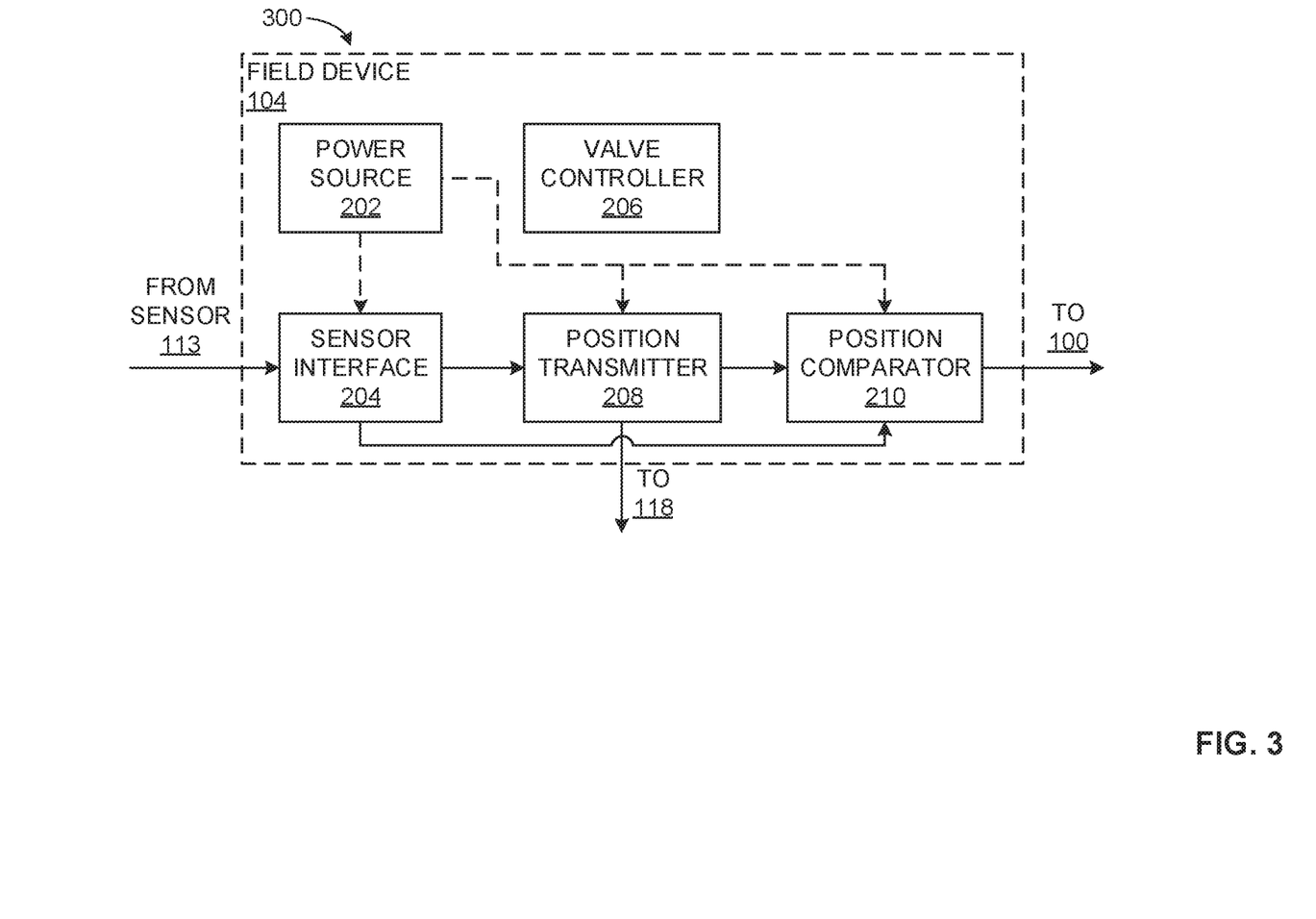
FIG. 3 is a block diagram of an alternate example implementation of the field device of FIG. 1.

FIG. 3 is a block diagram of an alternate example implementation 300 of the field device 104. In the illustrated example of FIG. 3, the power source 202 does not apply power to the valve controller 206 and the field device 104, in such a configuration, is utilized for the functionality of the position transmitter 208, including transmission of a valve position parameter to the process control system 118. In such an example, the position comparator 210 does not receive an interpreted valve position parameter from the valve controller 206. As such, the position comparator 210, in such examples, is only to determine a deviation between the interpreted valve position parameter received from the position transmitter 208 and the unprocessed valve position parameter received from the sensor interface 204.

Figure 4:
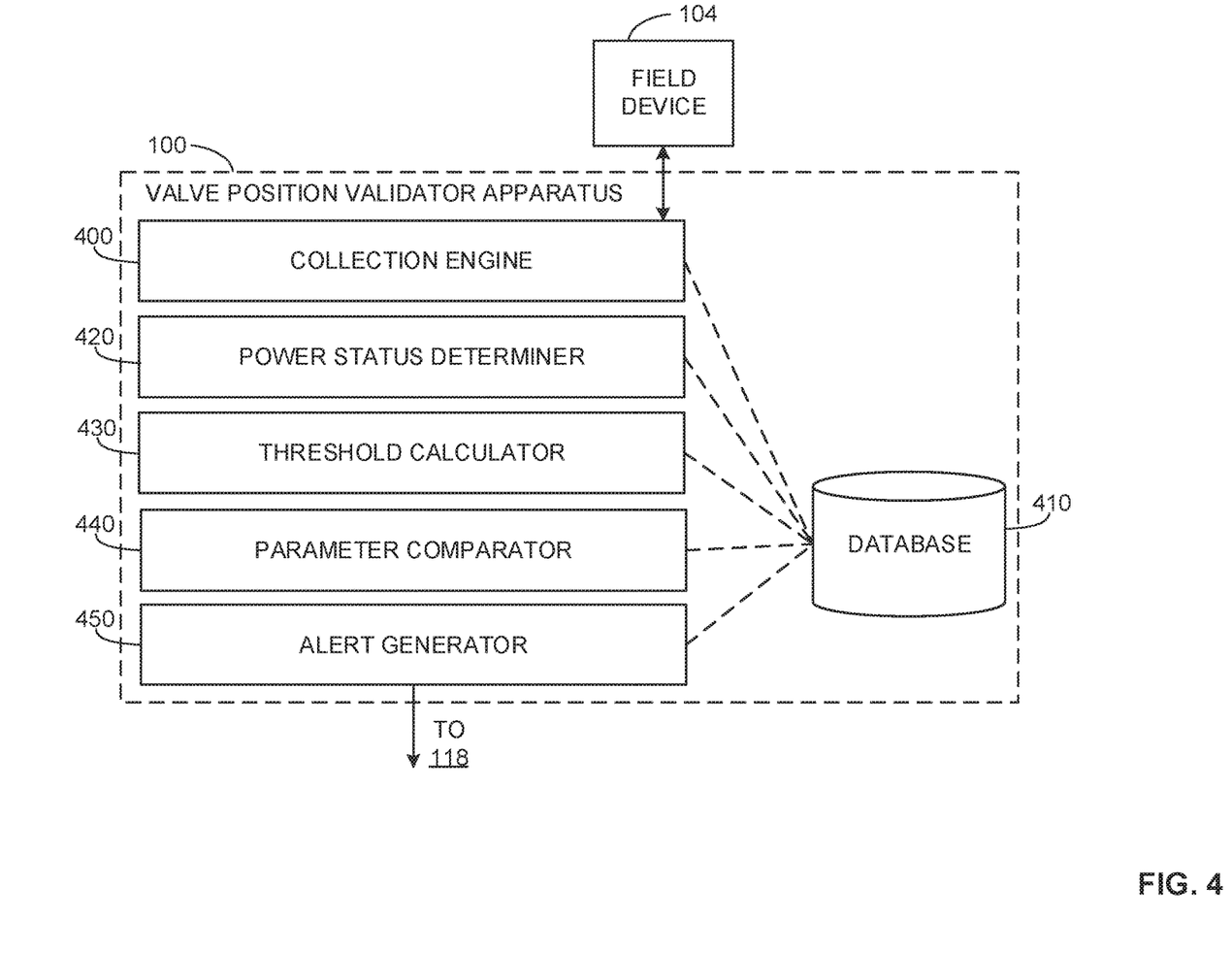
FIG. 4 is a block diagram of an example implementation of the example valve position validator apparatus of FIG. 1.

FIG. 4 is a block diagram of an example implementation of the VPV apparatus 100 of FIG. 1. The example VPV apparatus 100, utilizing parameters received from the field device 104, determines if a deviation between valve position parameters exceeds a threshold. For example, the VPV apparatus 100 may determine if the deviation between at least one of an interpreted valve position parameter determined by the valve controller 206, the interpreted valve position parameter determined by the position transmitter 208, and the unprocessed valve position parameter received by the sensor interface 204 exceeds a threshold. The example VPV apparatus 100 includes an example collection engine 400, an example database 410, an example power status determiner 420, an example threshold calculator 430, an example parameter comparator 440, and an example alert generator 450. The example VPV apparatus 100 is communicatively coupled to the example field device 104.

In the illustrated example of FIG. 4, the VPV apparatus 100 includes the collection engine 400 to obtain, select, and process valve position parameters (e.g., a measured position of the valve, a commanded position of the valve, power status of a field device, a deviation between valve position parameters, etc.) for the valve 112. For example, the collection engine 400 may obtain, select, and process valve position parameters acquired from the field device 104. In another example, the collection engine 400 may obtain, select, and process the valve position parameters from the database 410. In yet another example, the collection engine 400 may obtain, select, and process valve position parameters from the field device 104 via a direct wired or wireless connection.

In some examples, the collection engine 400 obtains valve position parameters from one or more valves during a time period of normal operation of the one or more valves (e.g., during an operational valve process, during an operational process control system process, etc.). In some examples, the collection engine 400 obtains processed valve parameters, where the processed valve parameters include processed valve position parameters (e.g., scaled parameters, translated parameters, etc.). In some instances, the collection engine 400 obtains unprocessed valve parameters, where the unprocessed valve parameters include unprocessed valve position parameters (e.g., unscaled parameters, untranslated parameters, etc.).

In the illustrated example of FIG. 4, the collection engine 400 processes the valve position parameters by sorting the valve position parameters by information type. For example, a valve position parameter may include a string of data separated by one or more data delimiters (e.g., a hash mark "#", a space, a comma, etc.). The valve position information located between data delimiters may represent a timestamp and/or a value for the valve position parameter. The timestamp may indicate a time at which the field device 104 records and/or processes the valve position parameter, a time at which the VPV apparatus 100 obtains the valve position parameters, etc. In some examples, the timestamp includes a date and time. However, any other timestamp format may additionally or alternatively be used. For example, the timestamp may include a time zone identifier, the time may be formatted using a twelve-hour representation, a twenty-four-hour representation, a Unix time representation, etc.

In some examples, valve position information located between data delimiters may represent a description for a valve position parameter. For example, the description may include a name of the valve position parameter (e.g., commanded position, first measured position, second measured position, etc.), a unit of measure of the valve position parameter (e.g., milliamps, volts, inches, millimeters, feet, etc.), etc. In some examples, the collection engine 400 processes the valve position parameter by determining if the valve position parameter is a calculated parameter based on whether the valve position parameter requires further calculations. For example, a valve position parameter with a length based unit of measure (e.g., inches, millimeters, feet, etc.) is a calculated parameter that was previously processed. Alternatively, a valve position parameter with a length based on an electrical signal parameter (e.g., milliamps, volts, watts, etc.) is unprocessed and requires further calculation. For example, a calibration curve may be utilized to convert the electrical signal parameter to a length based parameter.

In the illustrated example of FIG. 4, the VPV apparatus 100 includes the database 410 to record data (e.g., deviation threshold values, measured valve position values, commanded valve position values, actual deviation values, deviation trend values, etc.). In some examples, the database 410 records a flag (e.g., a valve position measurement invalid flag) and/or a variable associated with the obtained data. For example, the VPV apparatus 100 may set the valve position measurement invalid flag in the database 410. The example database 410 may respond to queries for information related to data in the database 410. For example, the database 410 may respond to queries for additional data by providing the additional data (e.g., the one or more data points), by providing an index associated with the additional data in the database 410, etc. The example database 410 may additionally or alternatively respond to queries when there is no additional data in the database 410 by providing a null index, an end of database 410 identifier, etc. The example database 410 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 410 may additionally or alternatively be implemented by one or more double data rate (DDR) memories, such as DDR, DDR2, DDR3, mobile DDR (mDDR), etc. The example database 410 may additionally or alternatively be implemented by one or more mass storage devices such as hard disk drive(s), compact disk drive(s) digital versatile disk drive(s), etc. While in the illustrated example the database 410 is illustrated as a single database, the database 410 may be implemented by any number and/or type(s) of databases.

In the illustrated example of FIG. 4, the VPV apparatus 100 includes the power status determiner 420 to determine the power status of the components (e.g., the sensor interface 204, the valve controller 206, the position transmitter 208, and/or the position comparator 210) of the field device 104. In some examples, the power status determiner 420 determines a status of the field device 104 based on a power status signal received from the field device 104. Additionally or alternatively, the power status determiner 420 can determine the power status of the field device 104A based upon the receipt of valve position parameters from the field device 104. For example, if the VPV apparatus 100 is receiving valve position measurements from the field device 104, the field device 104 must be powered on.

Upon determination of the power status of the components of the field device 104, the power status determiner 420 is further to communicate the power status of the components of the field device 104 to the database 410 for storage.

In the illustrated example of FIG. 4, the VPV apparatus 100 includes the threshold calculator 430 to calculate a threshold deviation between interpreted and/or received positions of a valve. In some examples, the threshold calculator calculates thresholds based on which of the valve controller 206 and the position transmitter 208 is powered on. For example, if the power status determiner 420 determines both the valve controller 206 and the position transmitter 208 are powered on, the threshold calculator 430 calculates a threshold deviation for at least one of the valve controller 206 interpreted valve position parameter and the position transmitter 208 interpreted valve position parameter, the valve controller 206 interpreted valve position parameter and the unprocessed valve position parameter received by the sensor interface 204, and the position transmitter 208 interpreted valve position parameter and the unprocessed valve position parameter received by the sensor interface 204.

In some examples, the threshold calculator 430 calculates the threshold based on an input from a user/operator working in the process control environment 102. Additionally or alternatively, the threshold is an automatically calculated value that is calculated based on one or more parameters of the process control environment 102. For example, a process with tighter control bounds (e.g., the process requires precise actuation of the valve 112) would utilize a threshold that is less than a threshold utilized for a process with large control bounds (e.g., the process does not require precise actuation of the valve 112). Additionally or alternatively, the threshold deviation can be a value utilized to confirm that the field device 104 is meeting the accuracy safety function requirements (e.g., the deviation percentage between values is less than or equal to 5%, the deviation between values is less than 2 mm, etc.) as specified in device certification for the field device 104. In some examples, the threshold calculator 430 can further distribute the calculated thresholds to the database 410.

Figure 5:
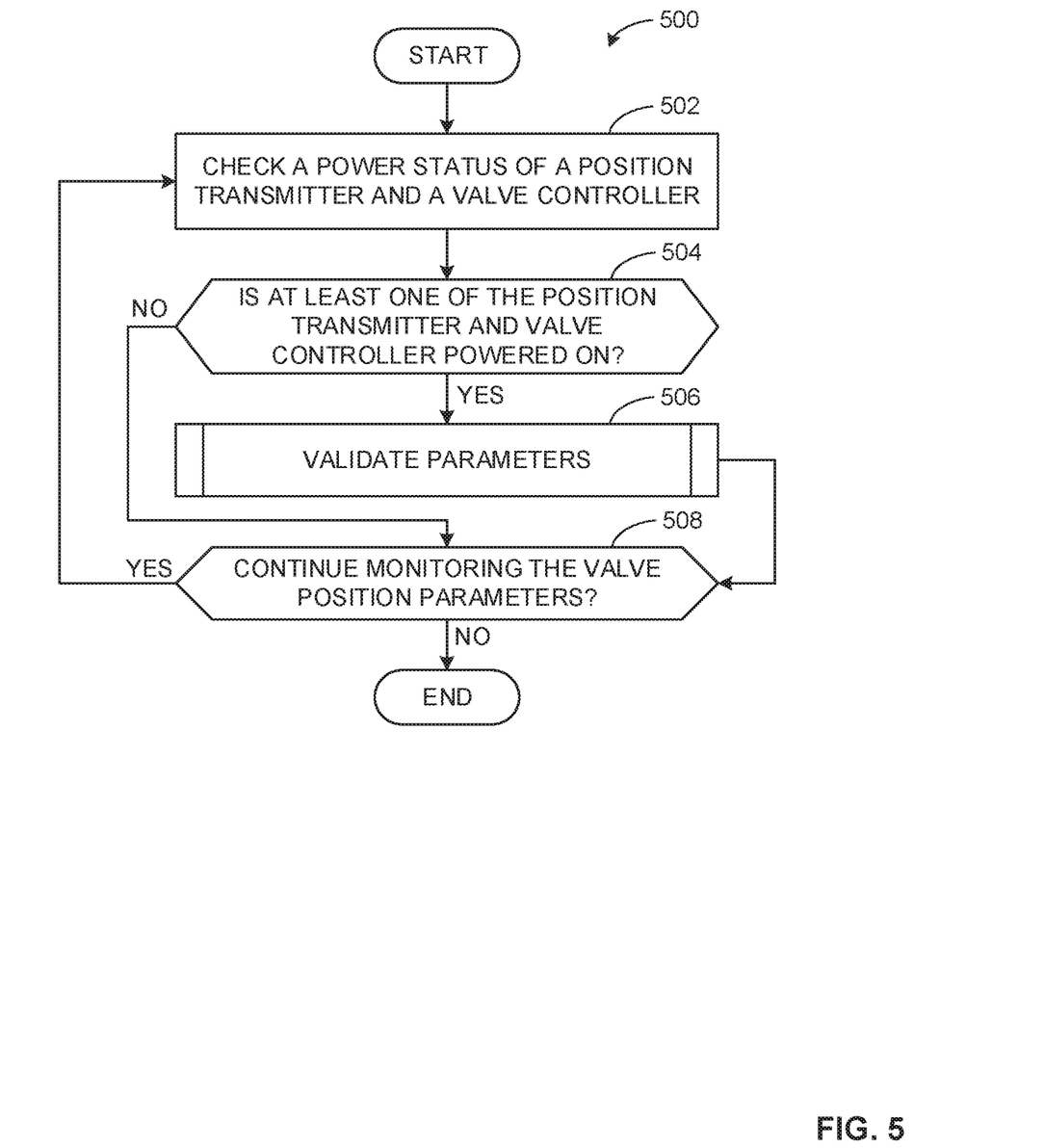
FIGS. 5-6 are flowcharts representative of example methods that may be performed using the example valve position validator apparatus of FIG. 1 to validate one or more position parameters of a valve.

In the illustrated example of FIG. 5, the VPV apparatus 100 includes the parameter comparator 440 to compare the one or more deviation thresholds calculated by the threshold calculator 430 and the one or more actual deviations received from the field device 104 by the collection engine 400. In some examples, the parameter comparator 440 compares a deviation threshold to an actual deviation by subtracting the actual deviation from the deviation threshold. If subtracting the actual deviation from the deviation threshold (e.g., a comparison value) yields a negative number (e.g., −3 millimeters, −5 inches, −2 milliamps, etc.), the parameter comparator 440 can determine that the actual deviation exceeds the threshold. Alternatively, if subtracting the actual deviation from the deviation threshold yields a positive number (e.g., 4 millimeters, 3 inches, 4 milliamps, etc.), the parameter comparator 440 can determine that the actual deviation does not exceed the threshold.

Additionally or alternatively, the parameter comparator 440 can determine if a percent deviation between valve position parameters exceeds a threshold. In such examples, the parameter comparator 440 is further to determine a percent deviation for one or more pairs of valve position parameters received from the field device 104. For example, if the unprocessed valve position parameter is 50 millimeters and the valve controller 206 interpreted valve position parameter is 49 millimeters, the percent deviation is 2%. The calculated percent deviation is then compared to a received threshold percent deviation value received from the threshold calculator 430. In some examples, when the parameter comparator 440 receives the unprocessed valve position parameter, the valve controller 206 interpreted valve position parameter, and the position transmitter 208 interpreted valve position parameter, the parameter comparator 440 can further apply a voting schema to the received parameters. For example, the parameter comparator 440 can utilize a majority rule on the received parameters to (e.g., two parameters out of the three received parameters) to determine a current valve position.

In some examples, the parameter comparator 440 can further distribute one or more of the comparison values to the database 410. Additionally or alternatively, the parameter comparator 440 can distribute a flag to the database 410 for any deviation that exceeds its respective threshold.

In the illustrated example of FIG. 4, the VPV apparatus 100 includes an alert generator 450 to determine an alert condition based on the parameter comparator 440 determining a deviation received from the field device 104 exceeds a threshold calculated by the threshold calculator 430. In some examples, the alert generator 450 stores a dataset pertaining to the alert condition in the database 410. Further in such examples, the dataset stored in the database 410 can include information regarding the valve position parameters for which the deviation exceeds the threshold. For example, the dataset can include the position (e.g., 25% closed, 75% open, 24 millimeters, etc.) set forth by the parameter, a timestamp of the parameter, a deviation between two or more parameters, etc.

In response to identifying an alert condition exists, the example alert generator 450 may generate an alert such as, for example, sounding an alarm, propagating an alert message throughout a process control network, generating a failure log and/or a report, displaying the alert on a display, etc. based upon instructions received from the database 410.

In some examples, the alert generator 450 can propagate the alert to a process control data acquisition system. In such examples, the process control data acquisition system can further utilize the generated alert to make a process control decision for the process control environment 102. In some examples, the control decision can instruct the process control environment 102 to shut off the valve 112. Additionally or alternatively, the control decision can instruct the process control environment 102 to divert fluid flow away from the valve 112. Additionally or alternatively, the control decision can instruct the process control environment 102 to limit fluid flow to the valve 112.

While an example manner of implementing the VPV apparatus 100 of FIG. 1 is illustrated in FIG. 4, one or more of the elements, processes and/or devices illustrated in FIG. 4 may be combined, divided, re-arranged, omitted, eliminated, and/or implemented in any other way. Further, the example collection engine 400, the example database 410, the example power status determiner 420, the example threshold calculator 430, the example parameter comparator 440, the example alert generator 450, and/or, more generally, the example VPV apparatus 100 of FIG. 1 may be implemented by hardware, software, firmware and/or any combination of hardware, software and/or firmware. Thus, for example, any of the example collection engine 400, the example database 410, the example power status determiner 420, the example threshold calculator 430, the example parameter comparator 440, the alert generator 450, and/or, more generally, the example VPV apparatus 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example collection engine 400, the example database 410, the example power status determiner 420, the example threshold calculator 430, the example parameter comparator 440, and/or the alert generator 450 is/are hereby expressly defined to include a non-transitory computer readable storage device or storage disk such as a memory, a digital versatile disk (DVD), a compact disk (CD), a Blu-ray disk, etc. including the software and/or firmware. Further still, the example VPV apparatus 100 of FIG. 1 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
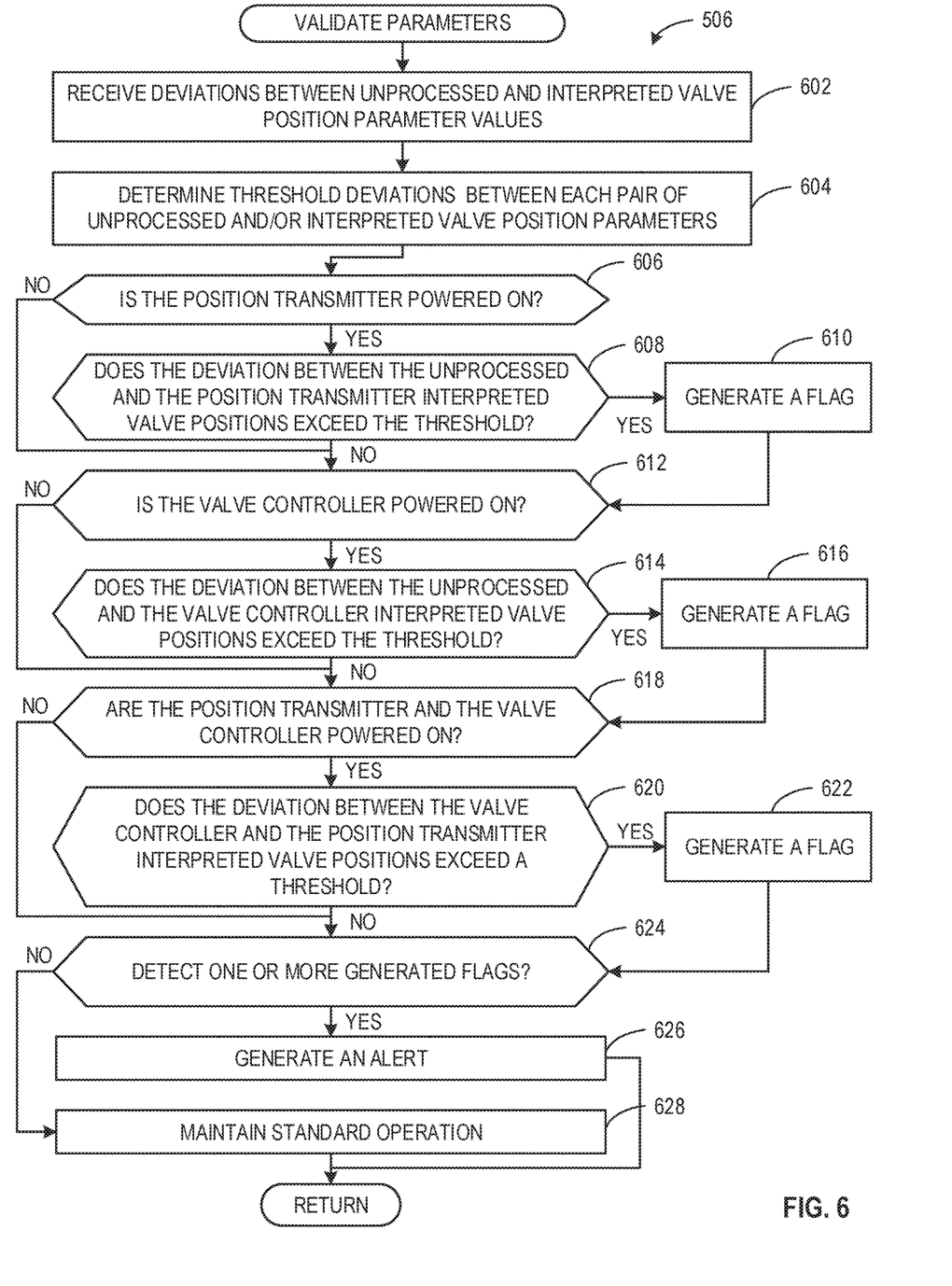

Flowcharts representative of example methods for implementing the VPV apparatus 100 of FIG. 1 are shown in FIGS. 5-6. In this example, the method(s) may be implemented using machine readable instructions comprising a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5-6, many other methods of implementing the example VPV apparatus 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

The example method 500 of FIG. 5 for validating one or more position parameters of a valve begins execution at block 502. At block 502, the power status determiner 420 checks a power status of each of the valve controller 206 and the position transmitter 208. At block 504, based upon the power status check completed at block 502, the power status determiner 420 is further to determine if at least one of the valve controller 206 and the position transmitter 208 are powered on. In response to at least one of the valve controller 206 and the position transmitter 208 being powered on, processing transfers to block 506. Alternatively, in response to each of the devices being powered off, processing transfers to block 508.

At block 506, further detailed in conjunction with FIG. 6, the VPV apparatus 100 validates one or more received/interpreted position parameters of the valve based on at least one of the valve controller 206 and the position transmitter 208 being powered on. In response to completing the processing of block 506, processing transfers to block 508.

At block 508, the VPV apparatus 100 determines whether it is desired to continue monitoring valve position measurements. In some examples, valve position measurements are monitored continuously. Additionally or alternatively, valve position parameters are monitored as long as at least one of the valve controller 206 and the position transmitter 208 is powered on. Additionally or alternatively, valve position parameters are monitored based on a schedule determined by a user/operator working in the process control environment 102. Additionally or alternatively, valve position parameters are monitored based on a schedule determined by a computer utilizing at least one of a predetermined schedule and/or a dynamically updating schedule based upon one or more parameters of the process control environment 102. In response to determining it is desired to continue monitoring valve position parameters, processing returns to block 502 of the example method 500. Alternatively, in response to determining it is no longer desired to continue monitoring valve position parameters, the example method 500 of FIG. 5 ends.

An example method that may be executed to validate position parameters of the valve (FIG. 5, block 506) when at least one of the valve controller 206 and the position transmitter 208 is powered on is illustrated in FIG. 6. With reference to the preceding figures and associated descriptions, the example method of FIG. 6 begins execution at block 602 at which the collection engine 400 receives valve position parameters from the one or more powered devices. For example, the collection engine 400 can receive the unprocessed valve position parameter when the field device 104 is powered on, the valve controller 206 interpreted valve position parameter when the valve controller 206 is powered on, and the position transmitter 208 interpreted valve position parameter when the position transmitter 208 is powered on. In some examples at block 602, the collection engine 400 is further to distribute the received valve position parameters to the database 410.

At block 604, the threshold calculator 430 calculates a threshold deviation between the values received by the collection engine 400 at block 602. For example, the threshold calculator 430 at block 604 can calculate a threshold deviation between the unprocessed valve position parameter and the valve controller 206 interpreted valve position parameter. In some examples, the threshold calculator 430 calculates the threshold based on an input from a user/operator working in the process control environment 102. Additionally or alternatively, the threshold is automatically calculated based on one or more parameters of the process control environment 102. In some examples at block 604, the threshold calculator 430 can further distribute the thresholds to the database 410.

At block 606, the power status determiner 420 determines the power status of the position transmitter 208 based on the check completed at block 502. In response to the position transmitter 208 being powered on, processing transfers to block 608. Alternatively, in response to the position transmitter 208 being powered off, processing transfers to block 612.

At block 608, the parameter comparator 440 retrieves each of the calculated deviation and the threshold deviation between the unprocessed valve position parameter and the position transmitter 208 interpreted valve position parameter from the database 410. Further at block 608, the parameter comparator 440 determines if the calculated deviation exceeds the threshold. In some examples, the parameter comparator 440 is further to distribute the difference between the calculated deviation and the threshold deviation to the database 410. In response to the calculated deviation exceeding the threshold, processing transfers to block 610. Alternatively, in response to the calculated deviation not exceeding the threshold, processing transfers to block 612.

At block 610, in response to the deviation between the unprocessed valve position parameter and the position transmitter 208 interpreted valve position parameter exceeding the respective threshold, the parameter comparator 440 generates a flag denoting such. Further at block 610, the parameter comparator 440 can distribute the flag to the database 410.

At block 612, the power status determiner 420 determines the power status of the valve controller 206 based on the check completed at block 502. In response to the valve controller 206 being powered on, processing transfers to block 614. Alternatively, in response to the valve controller 206 being powered off, processing transfers to block 618.

At block 614, the parameter comparator 440 retrieves each of the calculated deviation and the threshold deviation between the unprocessed valve position parameter and the valve controller 206 interpreted valve position parameter from the database 410. Further at block 614, the parameter comparator 440 determines if the calculated deviation exceeds the threshold. In some examples, the parameter comparator 440 is further to distribute the difference between the calculated deviation and the threshold deviation to the database 410. In response to the calculated deviation exceeding the threshold, processing transfers to block 616. Alternatively, in response to the calculated deviation not exceeding the threshold, processing transfers to block 618.

At block 616, in response to the deviation between the unprocessed valve position parameter and the valve controller 206 interpreted valve position parameter exceeding the respective threshold, the parameter comparator 440 generates a flag denoting such. Further at block 616, the parameter comparator 440 can distribute the flag to the database 410.

At block 618, the power status determiner 420 determines the power status of the valve controller 206 and the position transmitter 208 based on the check completed at block 502. In response to each of valve controller 206 and the position transmitter 208 being powered on, processing transfers to block 620. Alternatively, in response to at least one of valve controller 206 and the position transmitter 208 being powered off, processing transfers to block 624.

At block 620, the parameter comparator 440 retrieves each of the valve controller 206 interpreted valve position parameter and the position transmitter 208 interpreted valve position parameter from the database 410. Further at block 620, the parameter comparator 440 determines if the calculated deviation exceeds the threshold. In some examples, the parameter comparator 440 is further to distribute the difference between the calculated deviation and the threshold deviation to the database 410. In response to the calculated deviation exceeding the threshold, processing transfers to block 622. Alternatively, in response to the calculated deviation not exceeding the threshold, processing transfers to block 624.

At block 622, in response to the deviation between the valve controller 206 interpreted valve position parameter and the position transmitter 208 interpreted valve position parameter exceeding the respective threshold, the parameter comparator 440 generates a flag denoting such. Further at block 622, the parameter comparator 440 can distribute the flag to the database 410.

At block 624, the alert generator 450 checks the database 410 for one or more flags generated in response to one or more deviations exceeding a respective threshold. In response to the detection of one or more generated flags, processing transfers to block 626. Alternatively, in response to determining no flags have been generated, processing transfers to block 628.

At block 626, the alert generator 450 generates an alert. In some examples, the example alert generator 450 may generate an alert such as, for example, generating an alarm (e.g., lighting up a stack light, sounding an auditory alarm, etc.), propagating an alert message throughout a process control network, generating a failure log and/or a report, displaying the alert on a display, etc. In some examples, the failure log and/or the report will further include a log of which of the calculated deviations exceed the respective threshold. Further in such examples, processing of the example method of FIG. 6 is complete and processing returns to block 508 of the example method 500 illustrated in FIG. 5.

At block 628, in response to no generated flags being detected in the database 410, no alert is required and the fluid process system 116 maintains normal operation. In such examples, processing of the example method of FIG. 6 is complete and processing returns to block 508 of the example method 500 illustrated in FIG. 5.

Figure 7:
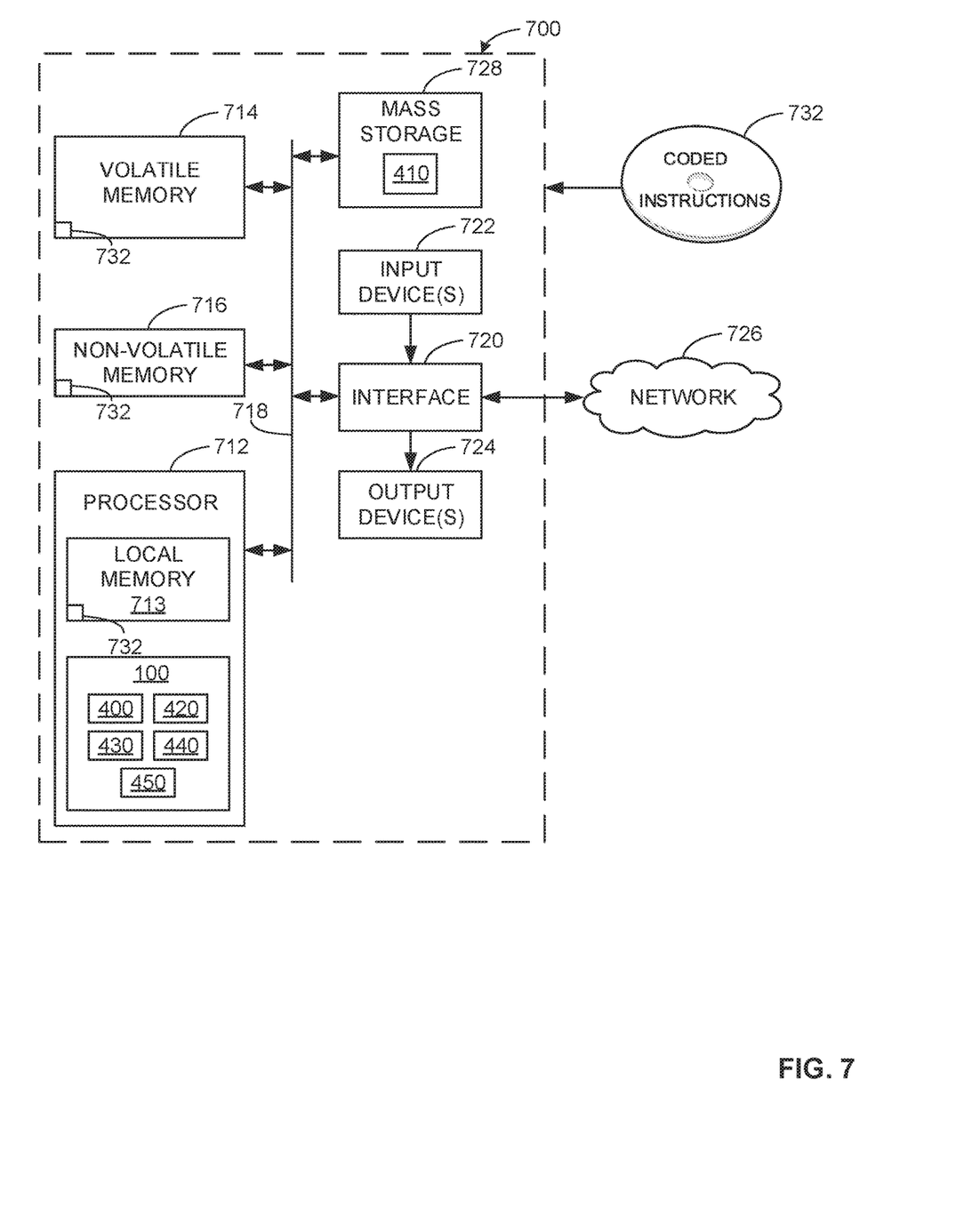
FIG. 7 is a block diagram of an example processing platform structured to execute machine readable instructions to implement the methods of FIGS. 5-6 and the example valve position validator apparatus of FIGS. 1 and/or 4.

FIG. 7 is a block diagram of an example processor platform 700 capable of executing instructions to implement the methods of FIGS. 5-6 and the valve position validator apparatus 100 of FIG. 1. The processor platform 700 can be, for example, a server, a personal computer, a mobile device (e.g., a cell phone, a smart phone, a tablet such as an iPad), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example VPV apparatus 100 that can, in some examples, include or otherwise implement the example collection engine 400, the example power status determiner 420, the example threshold calculator 430, the example parameter comparator 440, and the example alert generator 450.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint device, and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives. In this example, the one or more mass storage devices 728 implement the database 410.

Coded instructions 732 to implement the methods of FIGS. 5-6 may be stored in the mass storage device 728, in the volatile memory 714, in the non-volatile memory 716, and/or on a removable tangible computer readable storage medium such as a CD or DVD.

From the foregoing, it will be appreciated that example methods, apparatus and articles of manufacture have been disclosed that to detect a faulty field device before failure of the field device impairs the continuous operation of a process control system. Process control systems in which field devices fail during operation can experience increased periods of downtime which leads to loss of revenue. Additionally, field device failure during operation can also create hazardous operating conditions if the failed field devices provide erroneous or inaccurate data to the process control system. As such, detecting a faulty field device before failure of the field device is crucial to the successful operation of process control systems.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
 a field device, the field device further including:
  a sensor interface to receive an unprocessed valve position parameter from a sensor;
  a position transmitter;
  a valve controller; and
  a position comparator to determine a deviation between the unprocessed valve position parameter and interpreted valve position parameters independently determined by at least one of the position transmitter or the valve controller based on the unprocessed valve position parameter by:
   determining a first difference between the unprocessed valve position parameter and a first one of the valve position parameters determined by the position transmitter when the valve controller is not powered; and
   determining a second difference between at least one of the unprocessed valve position parameter, the first one of the valve position parameters, and a second one of the valve position parameters determined by the valve controller when the position transmitter and the valve controller are powered; and
 a valve position validator apparatus, the valve position validator apparatus further including:
  a parameter comparator to determine if the deviation exceeds a threshold; and
  an alert generator to generate an alert when the parameter comparator determines the deviation exceeds the threshold.

2. The apparatus of claim 1, wherein the interpreted valve position parameters are 4-20 milliamp current signals.

3. The apparatus of claim 1, wherein the valve position validator apparatus further includes a power status determiner, the power status determiner to determine a power status of at least one of the position transmitter and the valve controller, the position transmitter and the valve controller powered independently of one another.

4. The apparatus of claim 1, wherein the position comparator is to utilize a voting scheme on at least two of the unprocessed valve position parameter, the first one of the valve position parameters, and the second one of the valve position parameters to determine a current valve position.

5. The apparatus of claim 1, wherein the threshold is determined based upon an accuracy safety function requirement for the field device, the accuracy safety function requirement based upon a device certification for the field device.

6. A method comprising:
 receiving an unprocessed valve position parameter from a sensor;
 determining interpreted valve position parameters with at least one of a position transmitter or a valve controller based on the unprocessed valve position parameter;
 determining a deviation between the unprocessed valve position parameter and the interpreted valve position parameters by:
  determining a first difference between the unprocessed valve position parameter and a first one of the valve position parameters determined by the position transmitter when the valve controller is not powered; and determining a second difference between at least one of the unprocessed valve position parameter, the first one of the valve position parameters, and a second one of the valve position parameters determined by the valve controller when the position transmitter and the valve controller are powered;

determining if the deviation exceeds a threshold; and generating an alert in response to determining the deviation exceeds the threshold.

7. The method of claim 6, wherein the interpreted valve position parameters is a 4-20 milliamp current signal.

8. The method of claim 6, further including determining a power status of at least one of the position transmitter and the valve controller, the position transmitter and the valve controller powered independently of one another.

9. The method of claim 6, further including utilizing a voting scheme on at least two of the unprocessed valve position parameter, the first one of valve position parameters, and the second of the valve position parameters to determine a current valve position.

10. The method of claim 6, wherein the threshold is determined based upon an accuracy safety function requirement for a field device, the accuracy safety function requirement based upon a device certification for the field device.

11. A non-transitory computer readable storage medium comprising instructions which, when executed, cause a machine to at least:

receive an unprocessed valve position parameter from a sensor;

independently determine interpreted valve position parameters with at least one of a position transmitter or a valve controller based on the unprocessed valve position parameter;

determine a deviation between the unprocessed valve position parameter and the interpreted valve position parameters by:

determining a first difference between the unprocessed valve position parameter and a first one of the valve position parameters determined by the position transmitter when the valve controller is not powered; and determining a second difference between at least one of the unprocessed valve position parameter, the first one of the valve position parameters, and a second one of the valve position parameters determined by the valve controller when the position transmitter and the valve controller are powered;

determine if the deviation exceeds a threshold; and generate an alert when it is determined the deviation exceeds the threshold.

12. The non-transitory computer readable storage medium of claim 11, wherein the threshold is determined based upon an accuracy safety function requirement for a field device, the accuracy safety function requirement based upon a device certification for the field device.

13. The non-transitory computer readable storage medium of claim 11, wherein the instructions further cause the machine to determine a power status of at least one of the position transmitter and the valve controller.

14. The non-transitory computer readable storage medium of claim 11, wherein the instructions further cause the machine to determine a deviation between at least one of the unprocessed valve position parameter, the first one of the valve position parameters, and the second one of the valve position parameters when the position transmitter and the valve controller are powered.

* * * * *